(12) United States Patent
Green et al.

(10) Patent No.: US 12,379,063 B2
(45) Date of Patent: Aug. 5, 2025

(54) ADJUSTABLE STAND FOR COMPUTING DEVICE

(71) Applicant: TWELVE SOUTH, LLC, North Charleston, SC (US)

(72) Inventors: Andrew Bradford Green, North Charleston, SC (US); Christina Tapp, North Charleston, SC (US)

(73) Assignee: TWELVE SOUTH, LLC, Mt. Pleasant, SC (US)

( * ) Notice: Subject to any disclaimer, the term of this patent is extended or adjusted under 35 U.S.C. 154(b) by 0 days.

(21) Appl. No.: 18/233,324

(22) Filed: Aug. 13, 2023

(65) Prior Publication Data

US 2024/0052968 A1     Feb. 15, 2024

Related U.S. Application Data

(60) Provisional application No. 63/397,752, filed on Aug. 12, 2022.

(51) Int. Cl.
| | |
|---|---|
| *A47B 23/04* | (2006.01) |
| *F16M 11/04* | (2006.01) |
| *F16M 11/10* | (2006.01) |
| *F16M 11/38* | (2006.01) |

(52) U.S. Cl.
CPC ........... *F16M 11/041* (2013.01); *F16M 11/10* (2013.01); *F16M 11/38* (2013.01); *A47B 23/043* (2013.01); *A47B 23/044* (2013.01); *F16M 2200/068* (2013.01); *F16M 2200/08* (2013.01)

(58) Field of Classification Search
CPC ............ A47B 23/001; A47B 2023/004; A47B 2023/005; A47B 2023/043; A47B 2023/044; A47B 2023/046; A47B 19/08; A47B 23/004; A47B 23/005; A47B 23/043; A47B 23/044; A47B 23/046; F16M 11/10; F16M 11/38; F16M 2200/068
USPC ................ 248/460, 461, 462, 463, 464, 465
See application file for complete search history.

(56) References Cited

U.S. PATENT DOCUMENTS

| | | | | |
|---|---|---|---|---|
| 6,464,195 | B1* | 10/2002 | Hildebrandt | G06F 1/1683 248/920 |
| 7,364,129 | B1* | 4/2008 | Levari, Jr. | A47G 23/0216 108/4 |
| 7,503,539 | B2* | 3/2009 | Knight | A47B 23/043 248/458 |
| 8,724,312 | B2* | 5/2014 | Jones | G06F 1/1632 361/679.44 |
| 9,399,882 | B1* | 7/2016 | McGrath | E05D 11/1007 |
| 10,022,002 | B2* | 7/2018 | Chen | A47B 23/06 |
| 11,297,941 | B1* | 4/2022 | Hadar | A47B 23/043 |
| 2008/0006749 | A1* | 1/2008 | Ferritto | F16M 13/00 248/188.6 |

(Continued)

*Primary Examiner* — Alfred J Wujciak
(74) *Attorney, Agent, or Firm* — Wayne Edward Ramage; Baker Donelson (57) ABSTRACT

A stand for use with a laptop or computing device, such as, but not limited to, a MacBook. The stand has three primary components—a base, a support section, and a platform—that are hingedly or pivotally attached at joints at the respective ends of the support arms in the support section, thereby allowing the stand to be moved from a collapsed position to a fully open position. Stop tabs at or near the top end of the support arms help keep the laptop or computing device in place on the platform.

13 Claims, 15 Drawing Sheets

(56) References Cited

U.S. PATENT DOCUMENTS

| | | | |
|---|---|---|---|
| 2009/0289166 A1* | 11/2009 | Hopfer | A47B 23/043 |
| | | | 248/456 |
| 2014/0311388 A1* | 10/2014 | Korpi | A47B 23/043 |
| | | | 108/162 |
| 2022/0268401 A1* | 8/2022 | Zabelin | F16M 11/2021 |
| 2023/0129761 A1* | 4/2023 | Kotecha | A47B 23/042 |
| | | | 248/462 |

* cited by examiner

BOTTOM

FIG. 14

COLLAPSED

FIG. 15

ADJUSTABLE STAND FOR COMPUTING DEVICE

This application claims priority to and benefit of U.S. Provisional Application No. 63/397,752, filed Aug. 12, 2022, which is incorporated herein in its entirety by specific reference for all purposes.

FIELD OF INVENTION

This invention relates to a height-adjustable stand for use with a computing device, including but not limited to a laptop computer.

BACKGROUND OF THE INVENTION

While laptops have significant advantages over desktop computers in size and portability, they can be difficult to use. Many people place a laptop computer on their legs or lap while sitting or reclining, which can result in the computer overheating due to lack of air circulation. The same problem may arise when the laptop is placed on a desktop, counter or tabletop. In addition, when placed in such a position, the display of the laptop usually is below the most comfortable ergonomic viewing height for the user.

Accordingly, what is needed is a device for raising a laptop or display monitor on a desktop or tabletop to varying heights in a stable manner according to the desires of a user.

SUMMARY OF THE INVENTION

In various exemplary embodiments, the present invention comprises a stand for use with a laptop or portable computing device, such as, but not limited to, a MacBook. The stand elevates the laptop or portable computing device up off a desk or tabletop, reducing neck strain in the user and creating a more comfortable work setting. When used with a keyboard and/or mouse, it creates a convenient workstation.

The invention comprises three primary components: a base, a support section, and a platform for holding the laptop or portable computing device. The base and platform are curved in whole in part, generally in the shape of a half-circle, half-oval, or "horseshoe," although other curved forms may be used, such as a shape with a mix of straight edges and curved corners. The base and platform may be the same size and shape, or may vary in size and/or shape. In a preferred embodiment, the base and platform have the same width and general shape, but the base is deeper (longer) than the platform. In some embodiments, the base may be thicker and/or heavier than the platform.

The top of the platform may be covered in whole or in part with a nonslip material such as rubber, silicone, or the like. The nonslip material grips the laptop or computing device and help holds it in place. Similarly, the bottom of the base may be covered in whole or in part with a rubber, plastic, silicone or similar covering, or feet made of the same material or materials. In some embodiments, Teflon rails (or similar material) may be placed on the bottom of the base to allow the stand to be rotated or moved without leaving marks on the surface of the desk or table.

The support section generally comprises two parallel support arms, each with a lower end and an upper end. In several embodiments, one or more medial cross-supports extend between the support arms. The cross-support or supports may be orthogonal to the support arms, at a non-right-angle to the support arms, or a combination thereof. Each support arm is hingedly or pivotally connected at its lower end to a corresponding end or side of the base, thereby forming a corresponding lower joint. Each support arm is similarly hingedly or pivotally connected proximate to (near to), or at, its upper end to a corresponding end or side of the platform, thereby forming a corresponding upper joint.

The upper joint and lower joint on a support arm can move independently of each other, although both also can move at the same time. These joints are stiff enough to maintain their position, even with the weight of the computing device, such as a laptop, on the platform. In some embodiments, one or more of the joints are lockable to prevent movement until unlocked.

The joints can be opened or closed by the user applying appropriate pressure (pulling or pushing) on certain components. The stand can be moved smoothly from a fully collapsed (closed) position to a fully extended (opened) position, depending on the range of motion of the respective joints. Due to the nature of the joints as described above, the stand can thus be moved to a continuous range of positions between the fully closed and fully opened positions. As the lower joints and upper joints are on opposite ends of the support arms, the stand can appear to have a zig-zag (or Z-shaped) profile in side view, with the base being the bottom of the Z and the platform being the top of the Z.

In several embodiments, the upper end of the two parallel support arms is angled "upward" (i.e., away from the base) to provide a stop tab for the laptop or other computing device resting on the platform. The stop tabs are fixed and integrated with the support arms, and thus are independent of the platform, are not affixed to the platform, and do not tilt or move with the platform. The angle of the stop tabs with respect to the platform thus depends on the angle of the support arms with respect to the platform. The top face of the stop tabs may be covered in whole or in part with a nonslip material, such as rubber, silicone, or the like. The nonslip material grips the bottom edge of the laptop and helps hold it in place (i.e., preventing the laptop from slipping off the lower ends or edges of the platform).

The positioning of the stop tabs also permits the stand to present a low profile in a collapsed position. In the collapsed position, the stop tabs stay at or below the height of the platform, and thus present a leaner, smaller profile without extending above or sticking out from the platform (as would be the case if the stop tabs were affixed to the platform).

In a second position, the platform is elevated slightly, but the support arms and base remain in their starting "closed" positions. In a third position, the platform is elevated to a higher position, along with the support arms (the base remains in its starting position). In a fourth position, the platform is elevated to a high position (at or close to full extension, in some embodiments), as are the support arms. Due to the action of the corresponding upper joints, the support tabs have moved closer to the bottom end of the platform as the stand is opened, and the angle of the support tabs with respect to the platform has moved from oblique to acute (based on the top face of the support tab as compared to the top face of the platform).

DETAILED DESCRIPTION OF EXEMPLARY EMBODIMENTS

In several exemplary embodiments, the present invention comprises a stand 10 for use with a laptop or portable computing device, such as, but not limited to, a MacBook. The stand elevates the laptop or computing device (including portable computing devices) 8 up off a desk or tabletop, reducing neck strain in the user and creating a more comfortable work setting. When used with a keyboard and/or mouse, it creates a convenient workstation.

In the embodiment shown, the invention comprises three primary components: a base 20, a support section 30, and a platform 40 for holding the laptop or computing device. The base and platform are curved in whole in part, generally in the shape of a half-circle, half-oval, or "horseshoe," although other curved forms may be used, such as a shape with a mix of straight edges and curved corners. The base and platform may be the same size and shape, or may vary in size and/or shape. In a preferred embodiment, the base and platform have the same width and general shape, but the base is deeper (longer) than the platform. In some embodiments, the base may be thicker and/or heavier than the platform.

The top of the platform may be covered in whole or in part with a nonslip material 44, such as rubber, silicone, or the like. The nonslip material grips the laptop and help holds it in place.

Similarly, the bottom of the base may be covered in whole or in part with a rubber, plastic, silicone or similar covering, or feet made of the same material or materials 24. In some embodiments, Teflon rails (or similar material) may be placed on the bottom of the base to allow the stand to be rotated or moved without leaving marks on the surface of the desk or table, or other surface on which the stand rests.

The support section generally comprises two parallel support arms 34a each with a lower end and an upper end. In several embodiments, one or more medial cross-supports 34b extend between the support arms. The cross-support or supports may be orthogonal to the support arms, at a non-right-angle to the support arms, or a combination thereof. Each support arm is hingedly or pivotally connected at its lower end to a corresponding end or side of the base, thereby forming a corresponding lower joint 36. Each support arm is similarly hingedly or pivotally connected proximate to (near to), or at, its upper end to a corresponding end or side of the platform, thereby forming a corresponding upper joint 38.

The upper joint 38 and lower joint 36 can move independently of each other, although both can move at the same time. The joints are stiff enough to maintain their position, even with the weight of a computing device, such as a laptop, on the platform. In some embodiments, one or more of the joints are lockable to prevent movement until unlocked.

Figure 1:
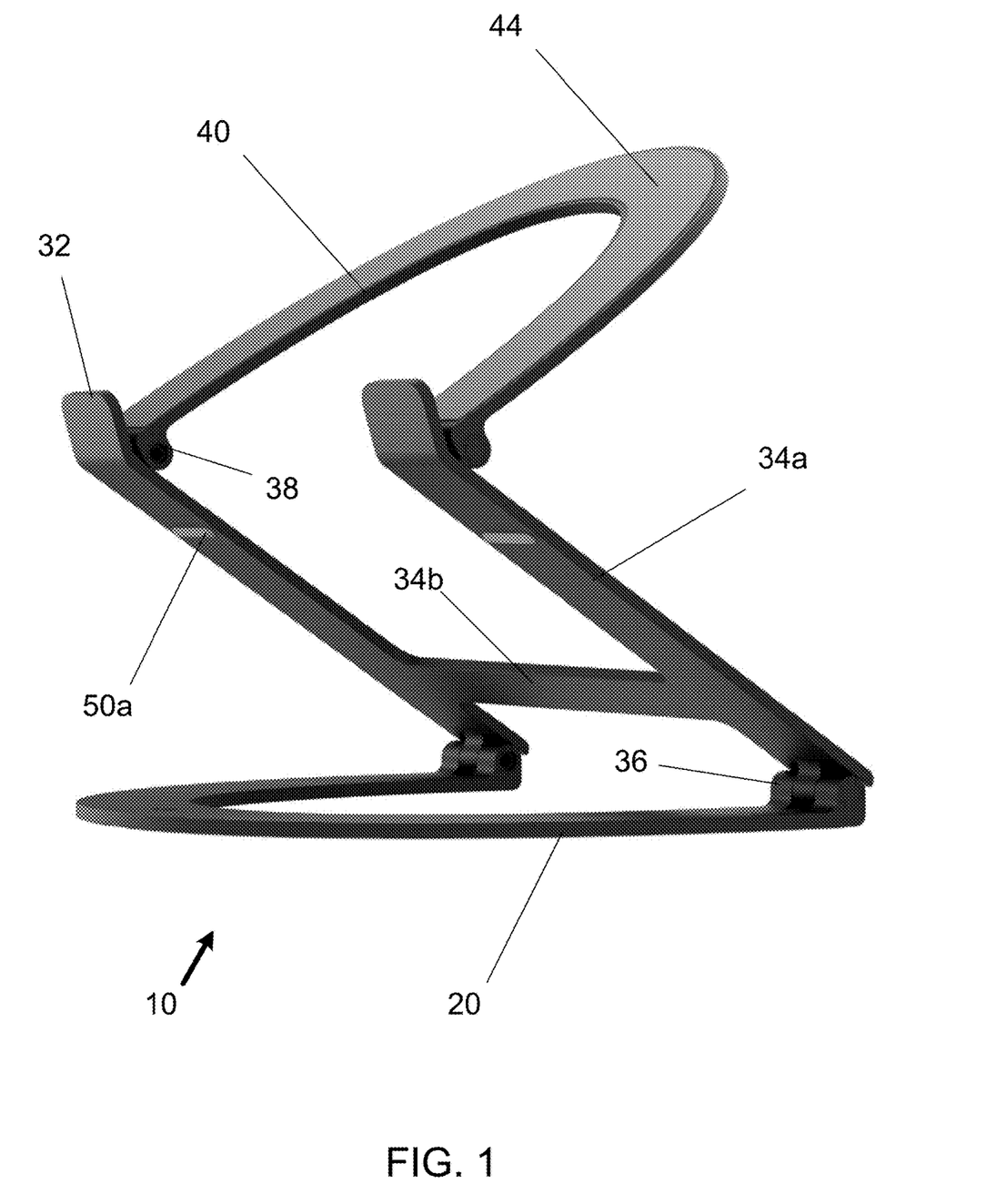
FIG. 1 shows a perspective view of a stand in accordance with an embodiment of the present invention.

The joints can be opened or closed by the user applying appropriate pressure (e.g., pulling and/or pushing) on certain components. The stand can be moved smoothly from a fully collapsed (closed) position to a fully extended (opened) position, depending on the range of motion of the respective joints. Due to the nature of the joints as described above, the stand can thus be moved to a continuous range of positions between the fully closed and fully opened positions. As the lower joints and upper joints are on opposite ends of the support arms, the stand can appear to have a zig-zag (or Z-shaped) profile in side view, with the base being the bottom of the Z and the platform being the top of the Z, In the embodiment shown in FIG. 1, the upper ends of the two parallel support arms are angled "upward" (i.e., away from the base) to provide a stop tab 32 for a laptop or other computing device resting on the platform. The stop tabs 32 are fixed and integrated with the support arms, and thus are independent of the platform, are not affixed to the platform, and do not tilt or move with the platform. In some embodiments, the stop taps may be separately affixed to the support arms. The angle of the stop tabs with respect to the platform thus depends on the angle of the support arms with respect to the platform. The top face of the stop tabs may be covered in whole or in part with a nonslip material, such as rubber, silicone, or the like 34. The nonslip material grips the bottom edge of the laptop and helps hold it in place (i.e., preventing the laptop from slipping off the lower ends or edges of the platform).

Figure 2:
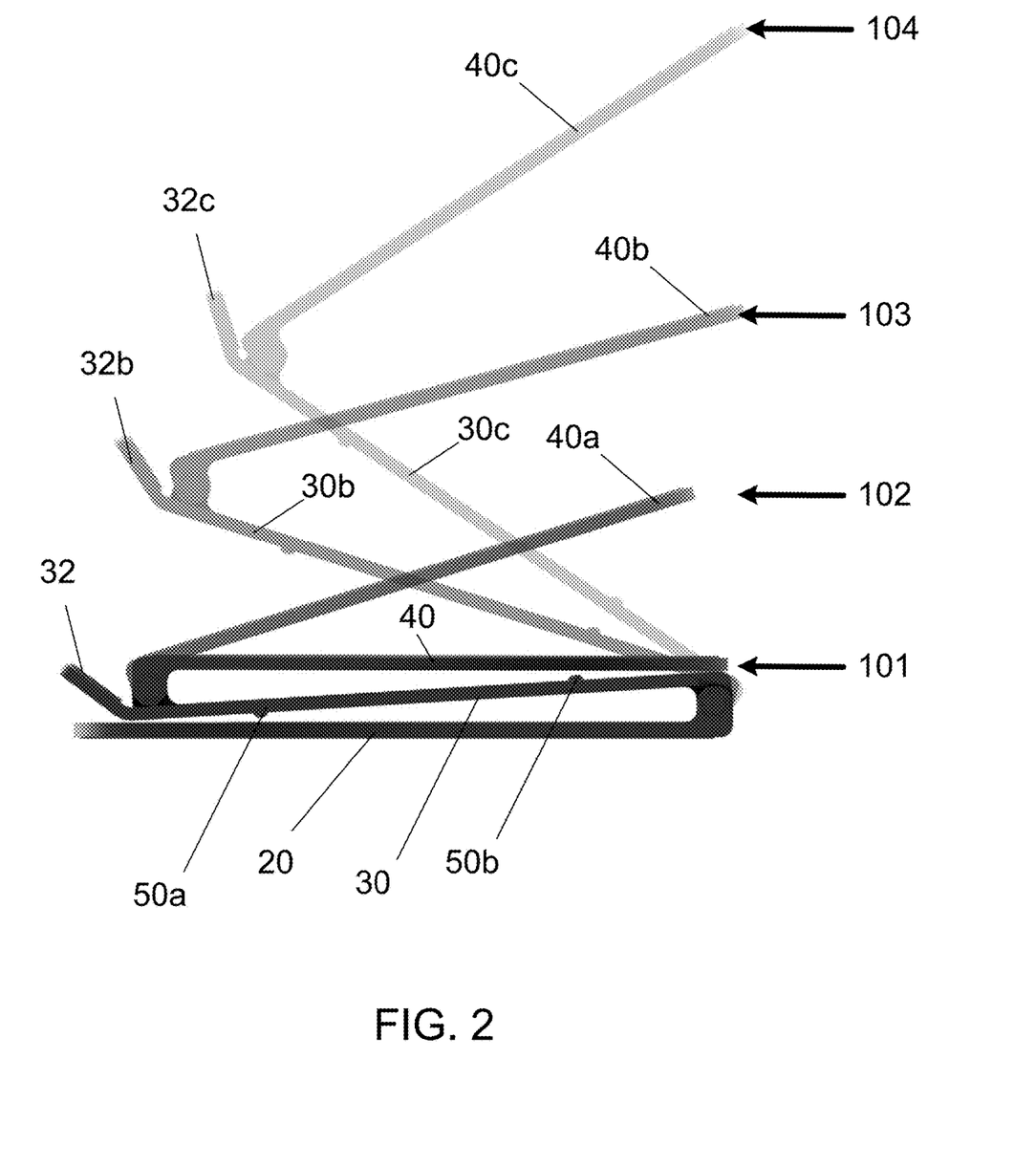
FIG. 2 shows a side view of the stand at different height positions
Figure 3:
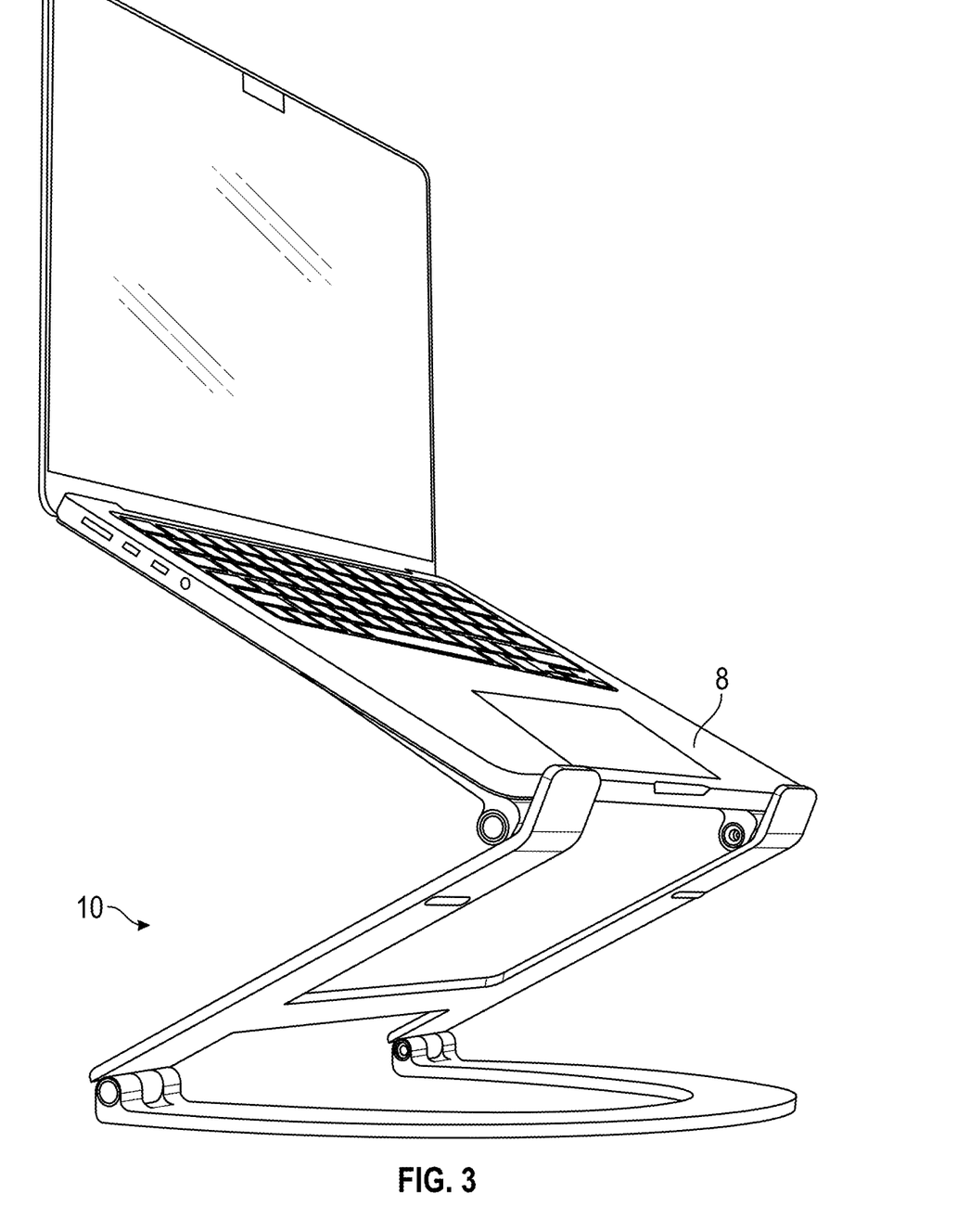
FIG. 3 shows a view of a stand in use.
Figure 4:
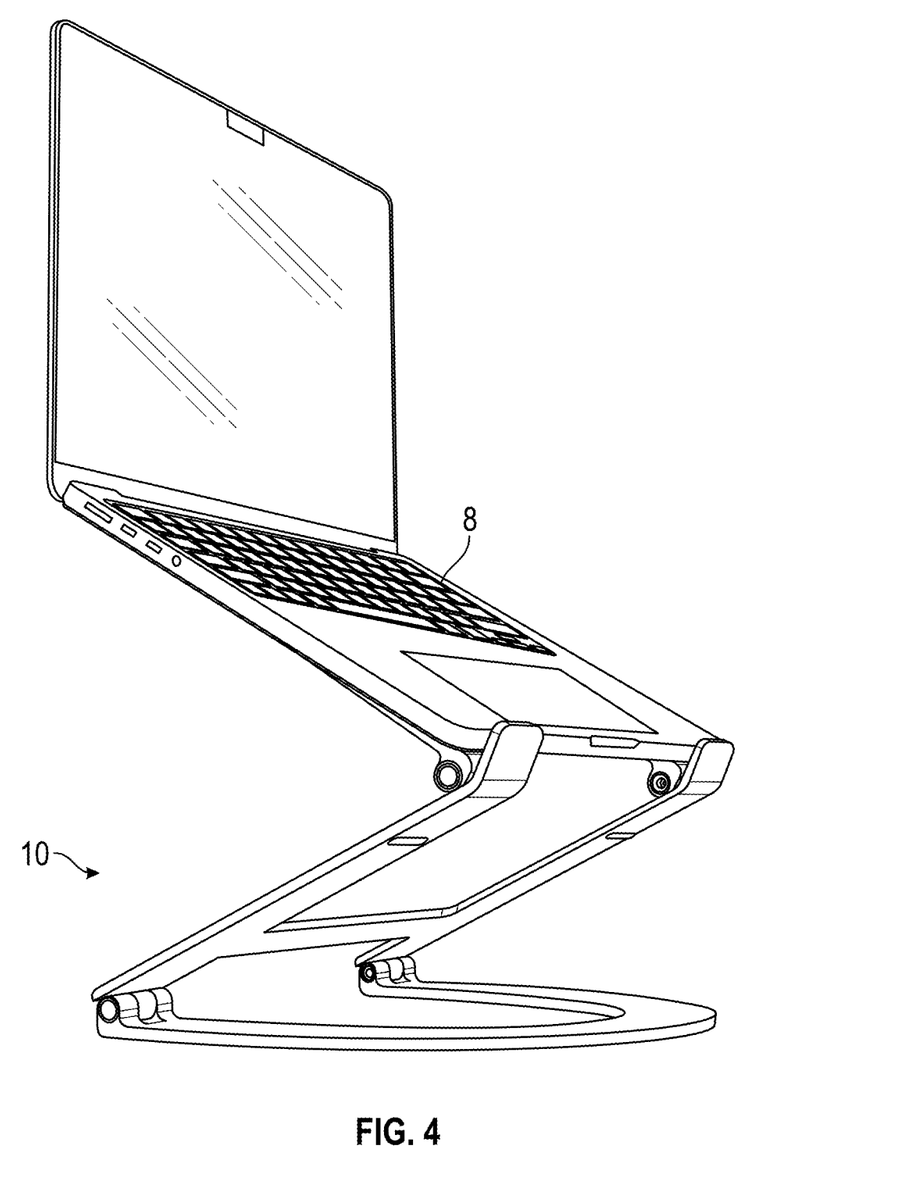
FIG. 4 shows another view of a stand in use.
Figure 5:
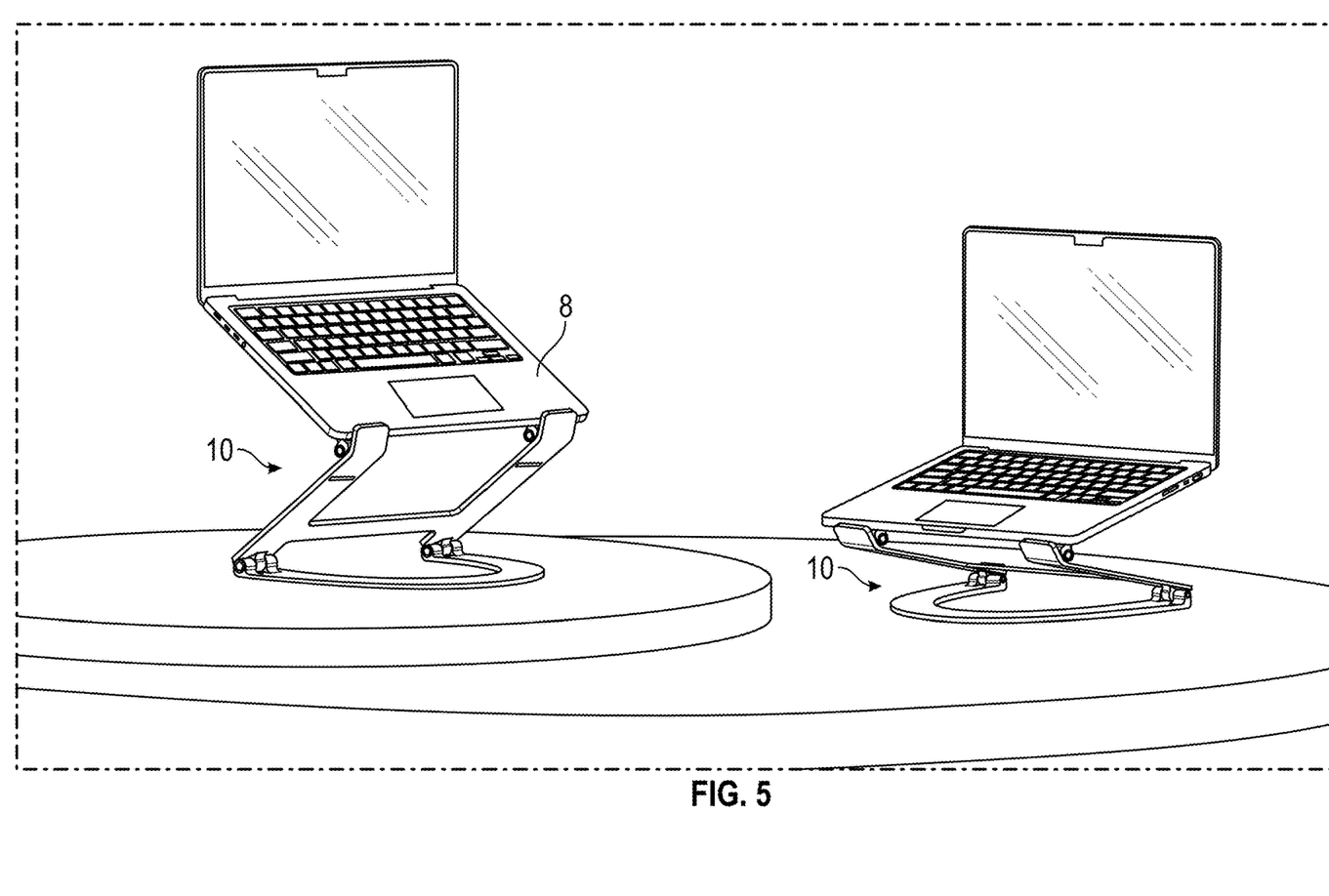
FIG. 5 shows a view of two stands in use at different heights.
Figure 6:
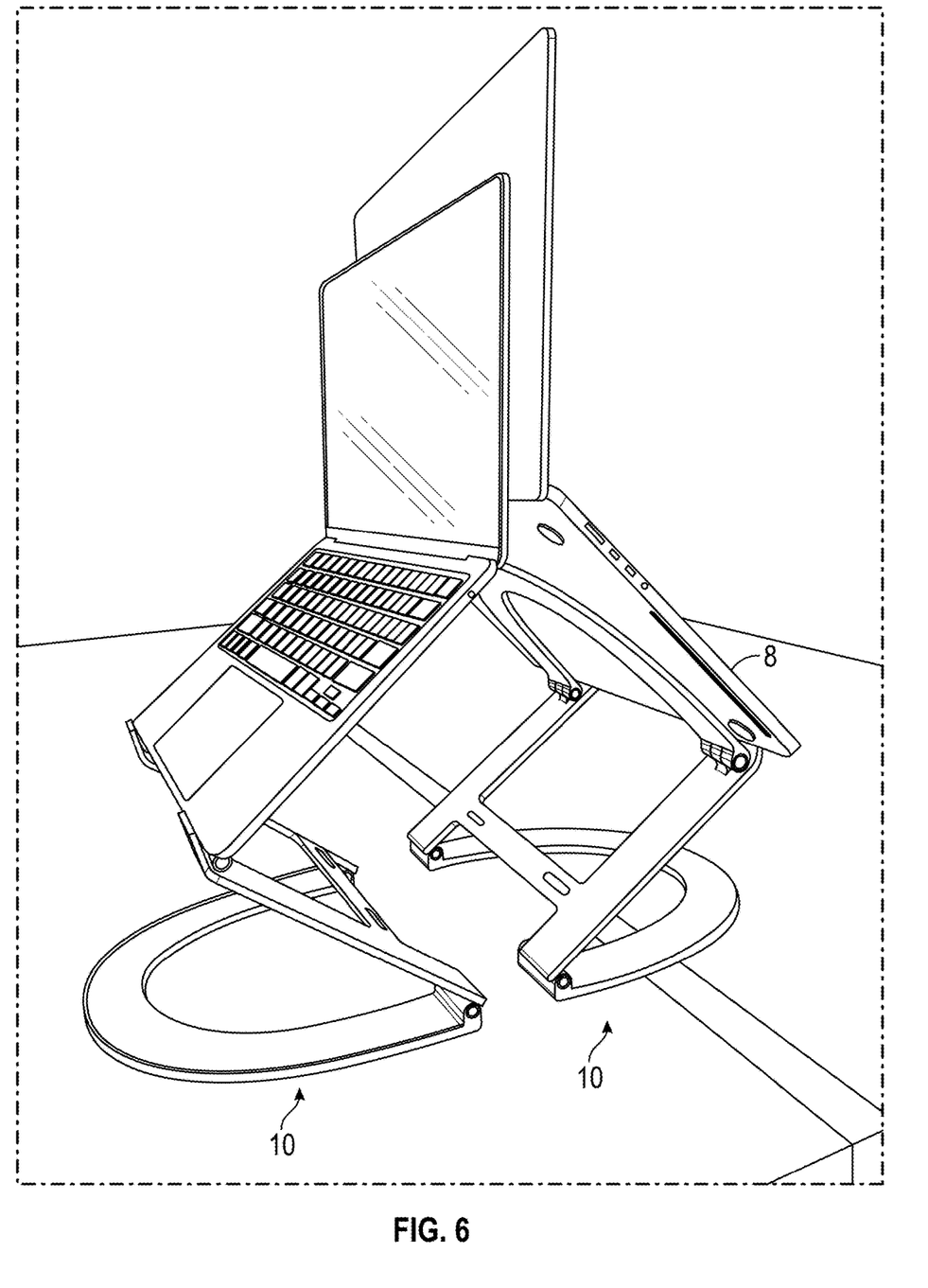
FIG. 6 shows another view of two stands in use.
Figure 7:
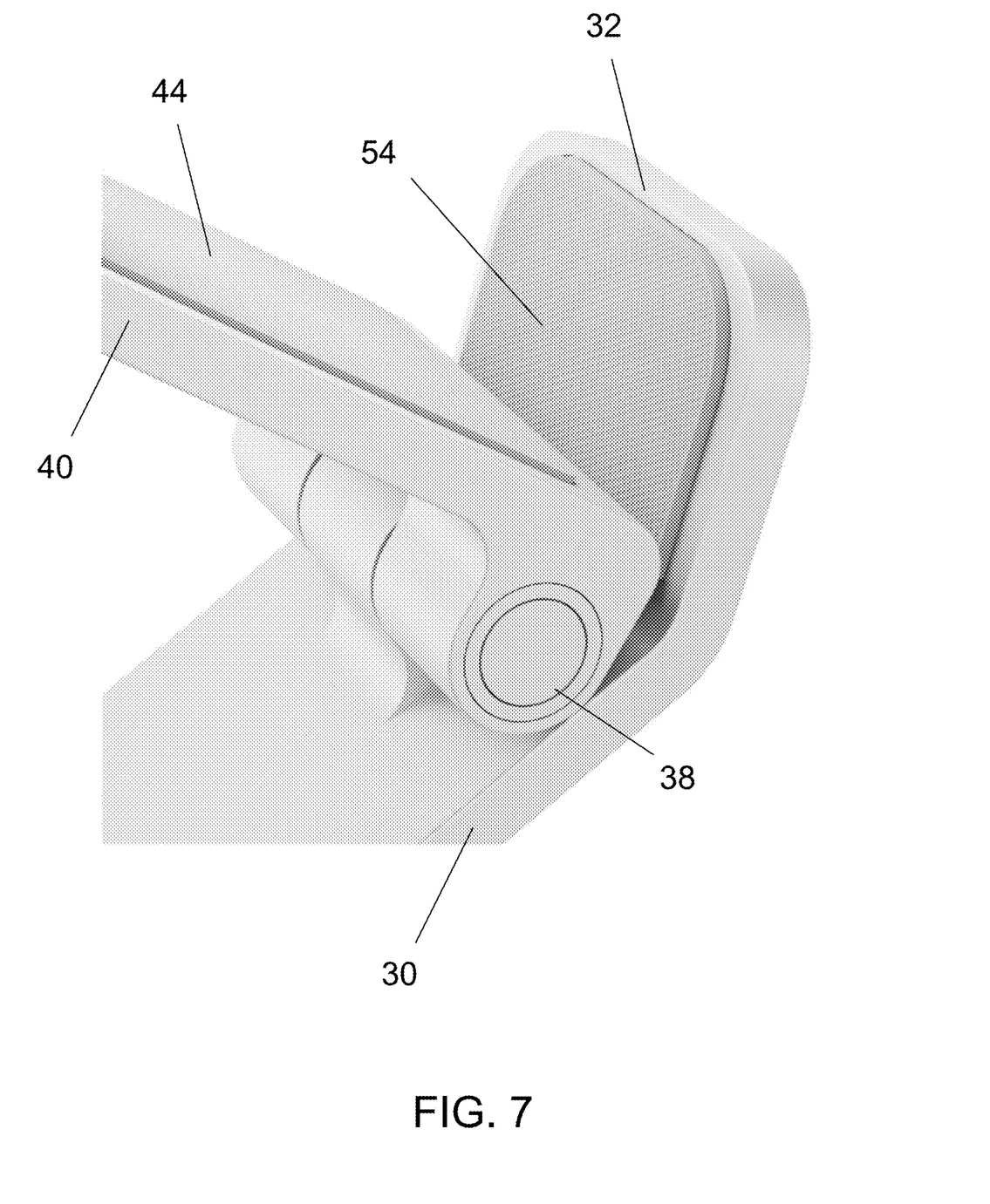
FIG. 7 shows a close-up of an upper joint with stop tab.
Figure 8:
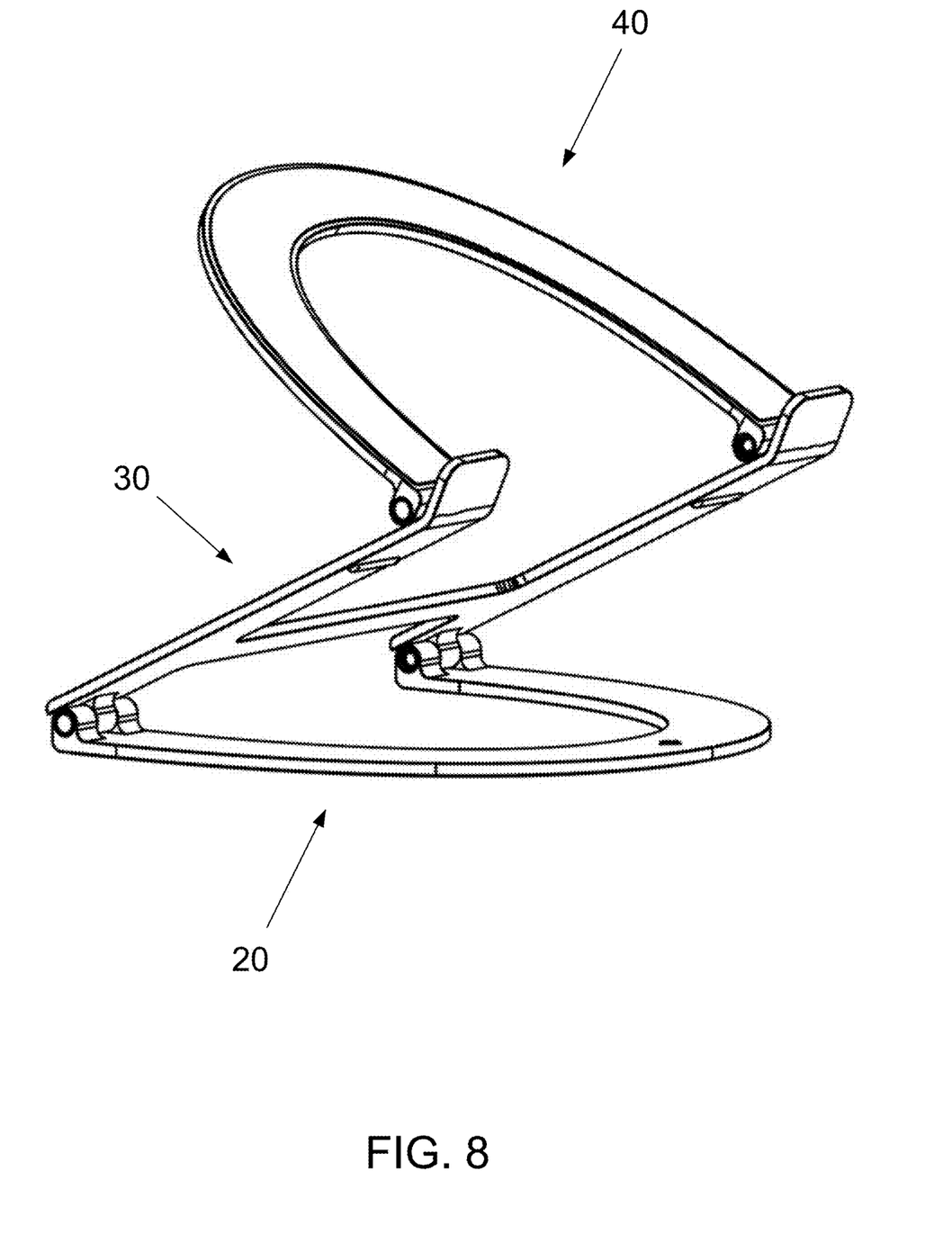
FIGS. 8-15 show additional profile and perspective views of the stand of FIG. 1.
Figure 9:
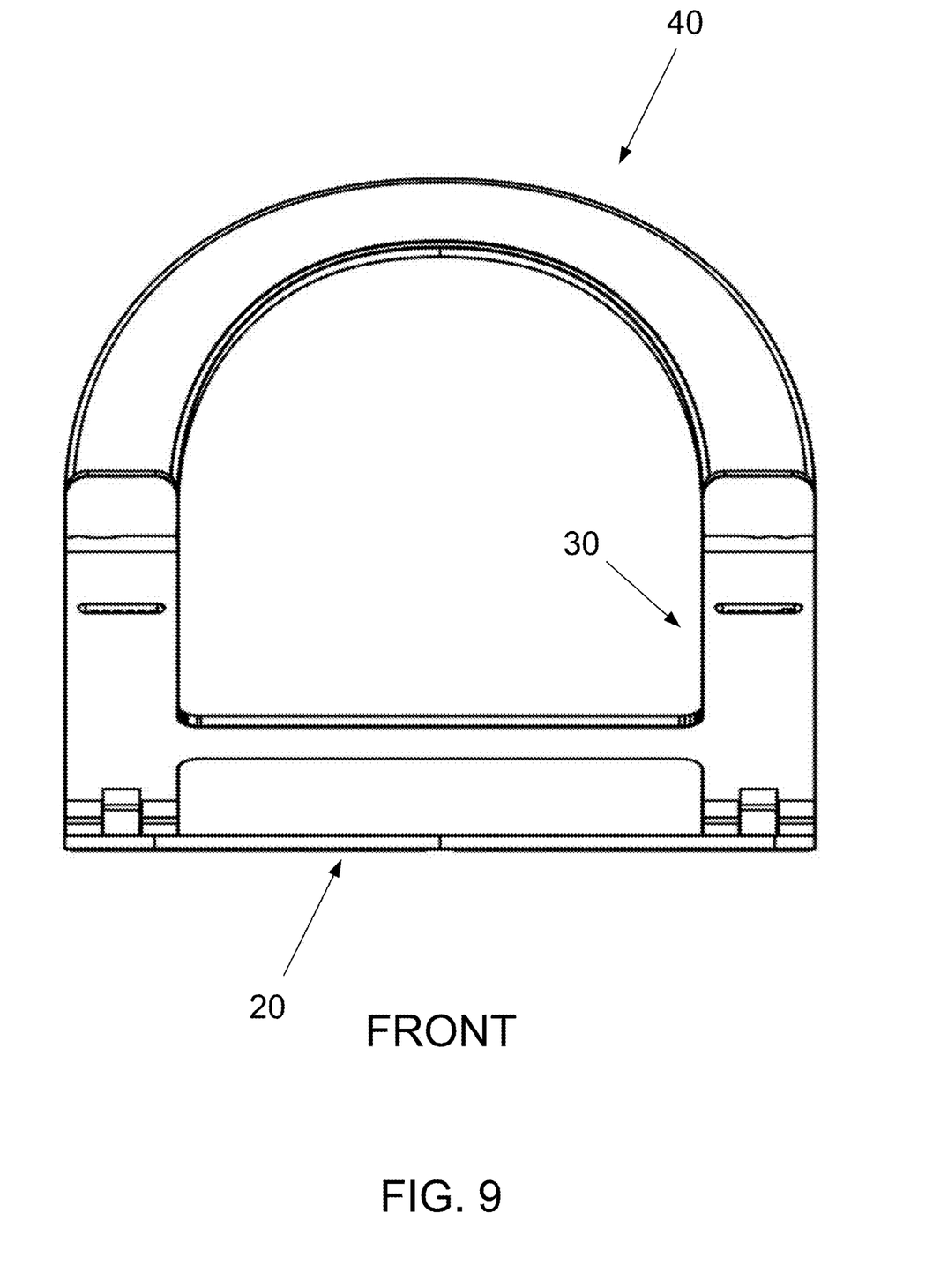
Figure 10:
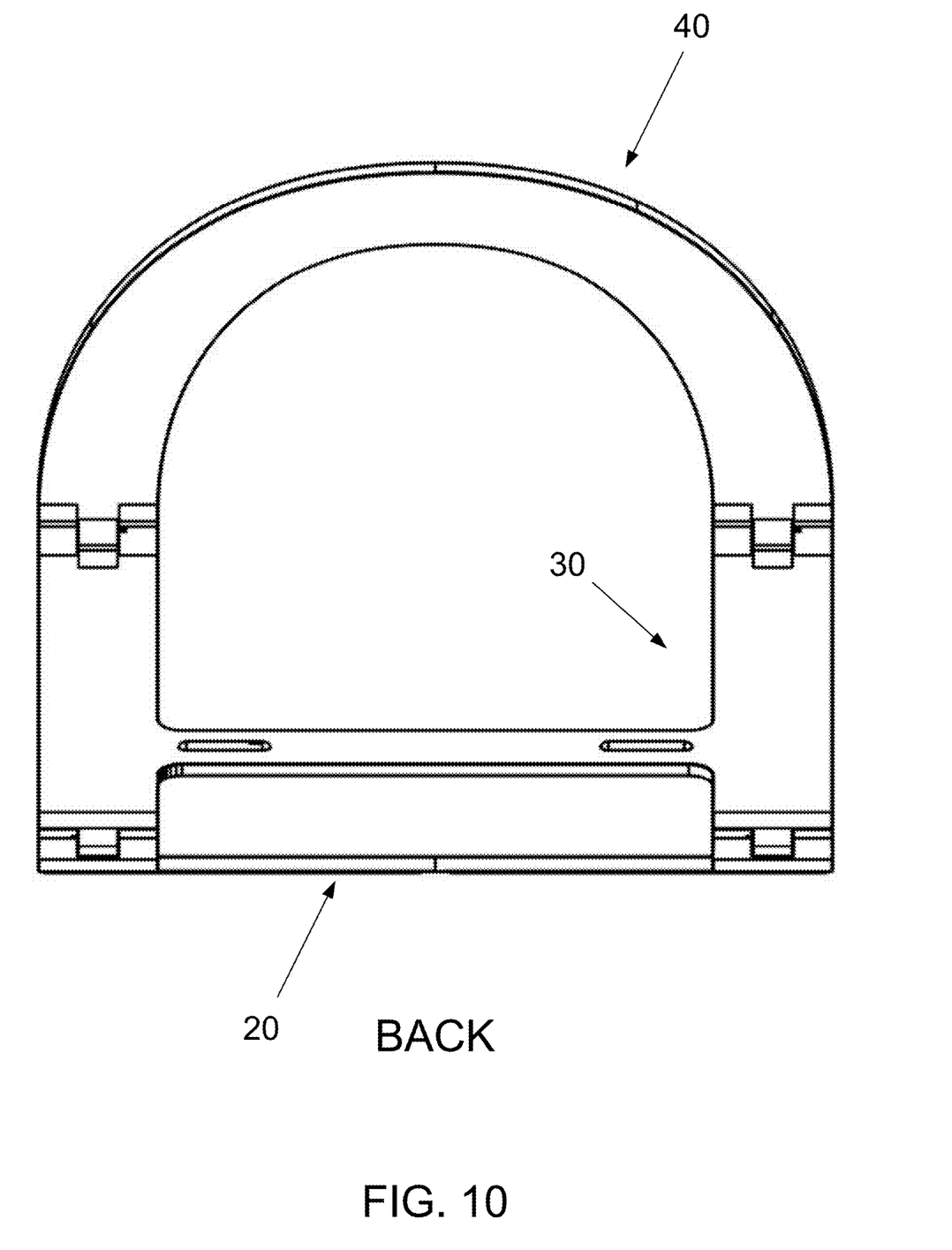
Figure 11:
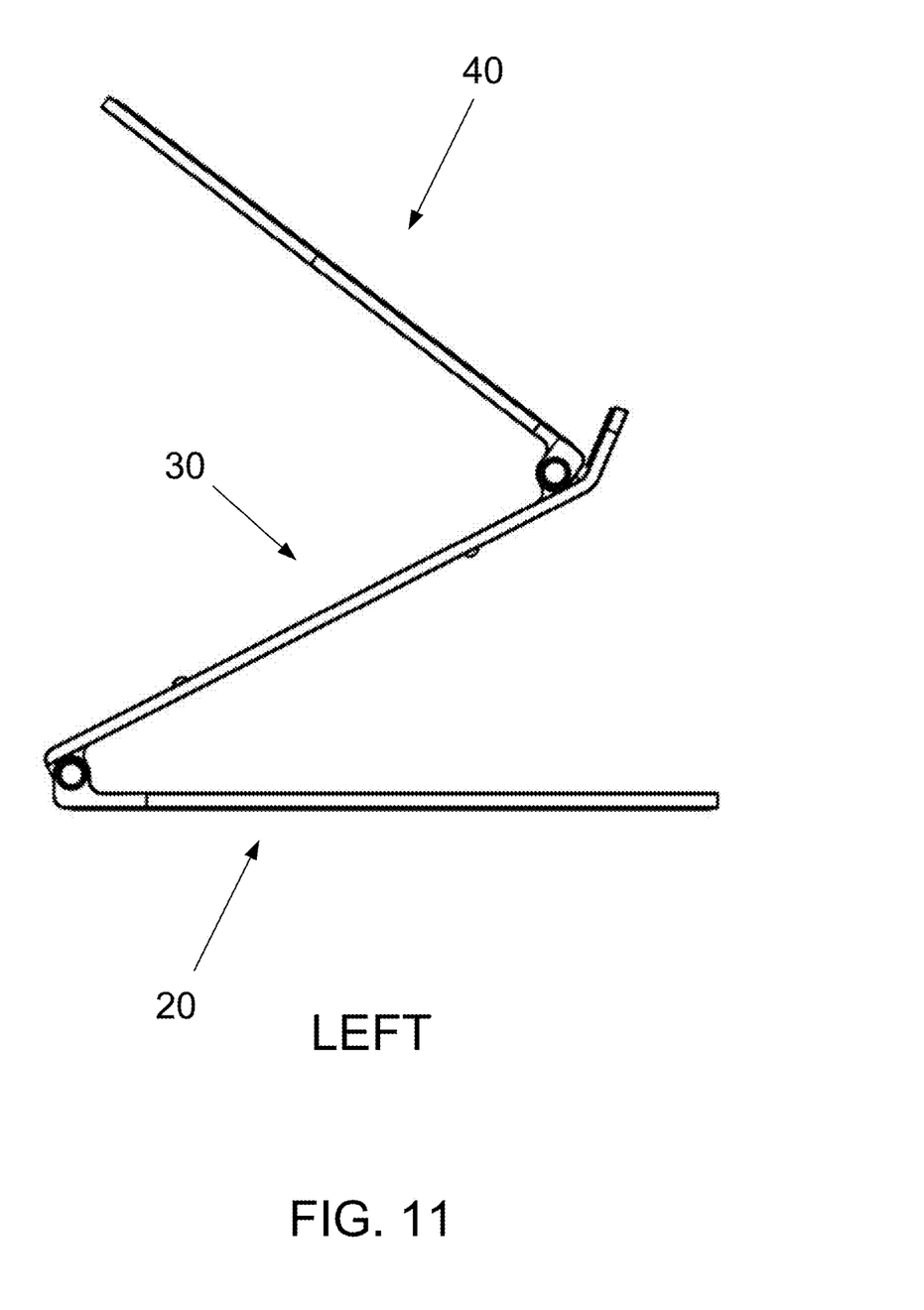
Figure 12:
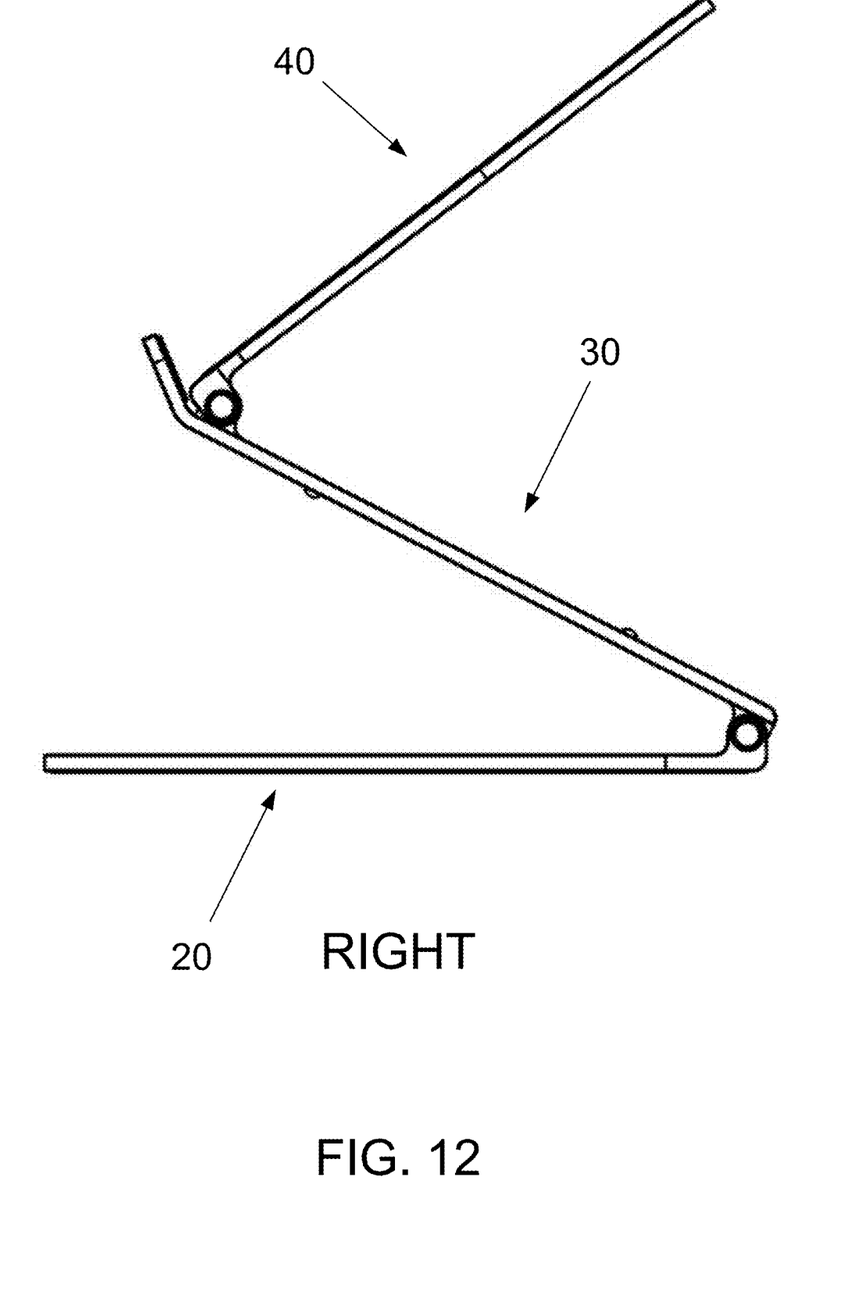
Figure 13:
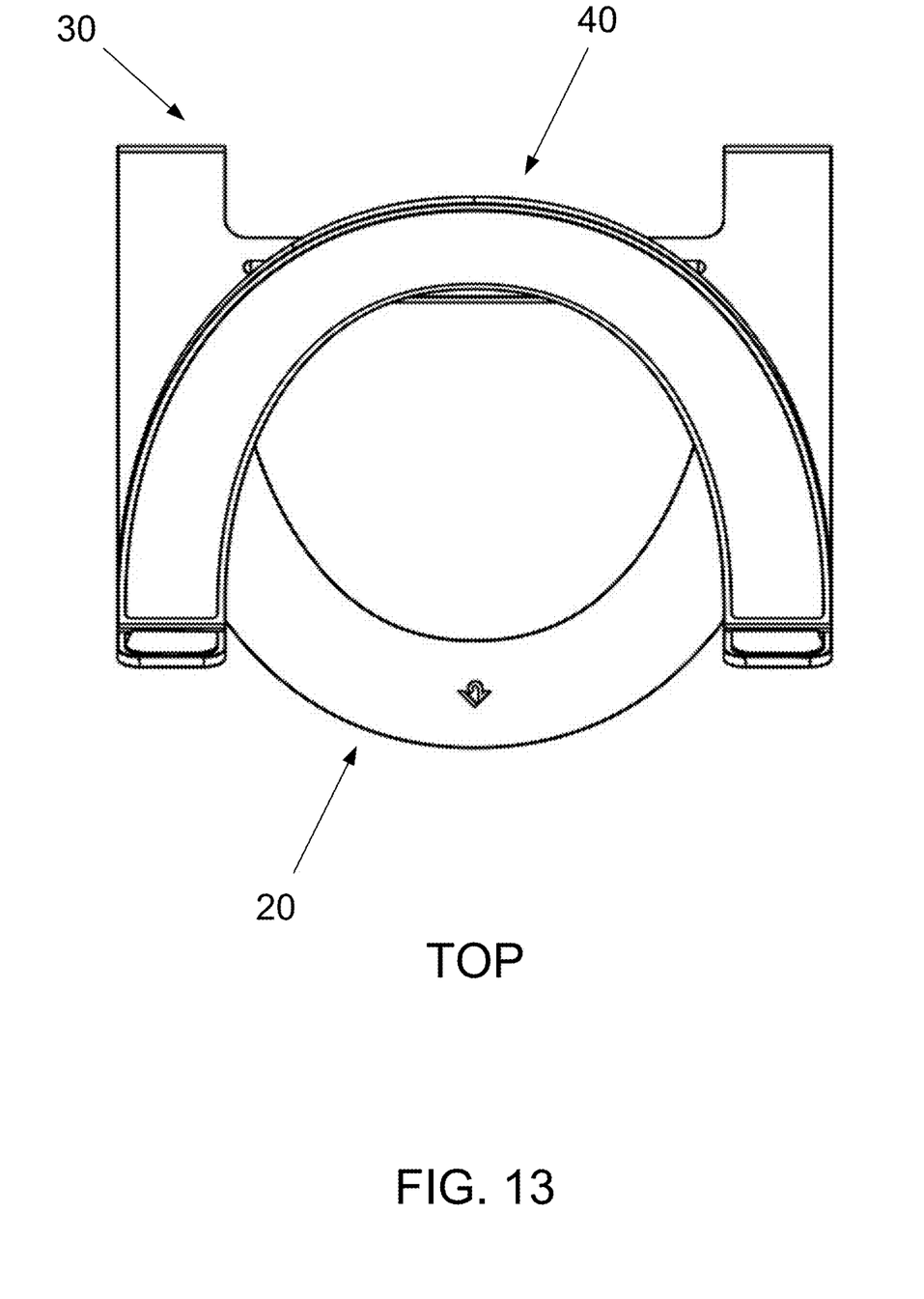
Figure 14:
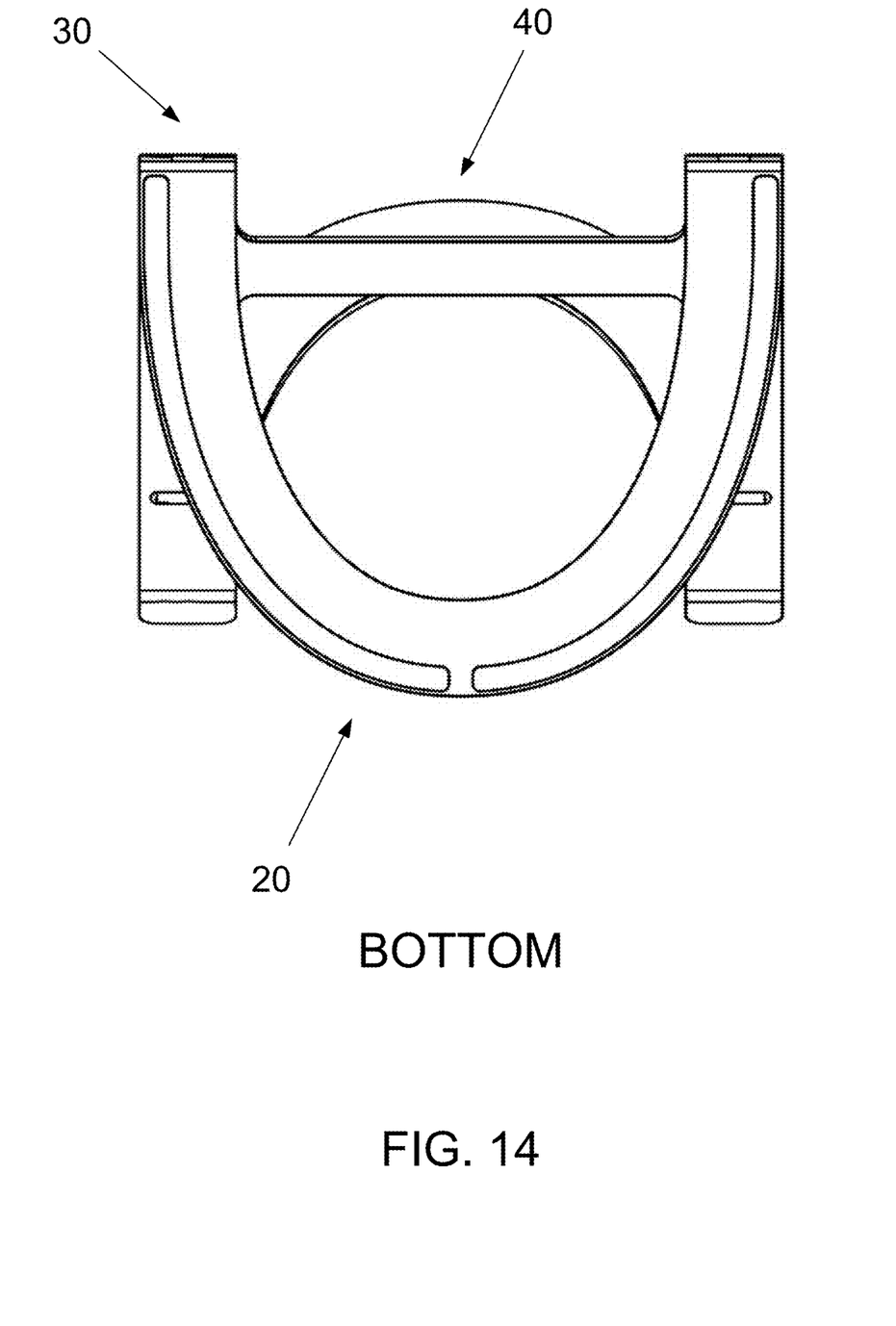
Figure 15:
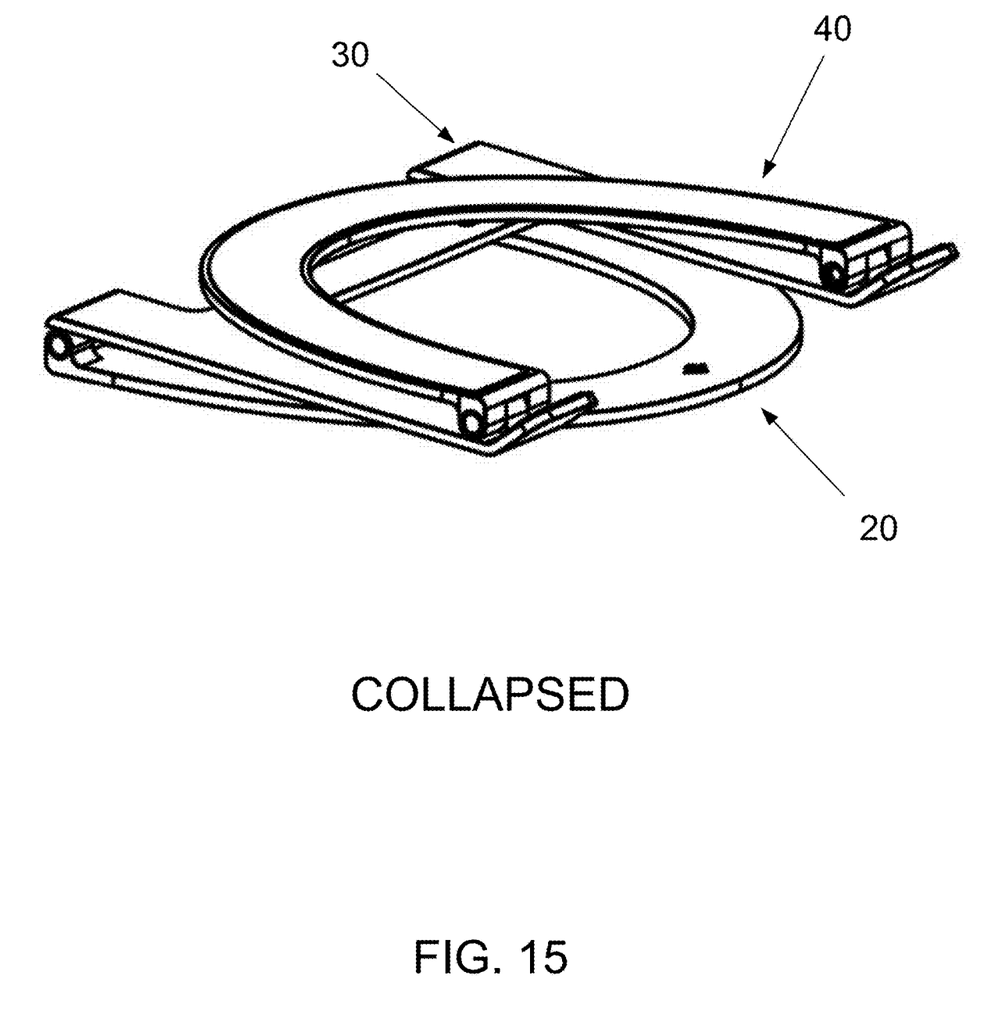

The positioning of the stop tabs also permits the stand to present a low profile in a collapsed position. As seen in FIG. 2, in the collapsed position 101 the stop tabs 32 stay at or below the height of the platform, and thus present a leaner, smaller profile without extending above or sticking out from the platform (as would be the case if the stop tabs were affixed to the platform).

In a second position 102, the platform 40a has been elevated slightly (at the back or circular end), but the support 30 and base 20 remain in their starting "closed" positions. In a third position 103, the platform has been elevated to a higher position 40b, as has the support 30b (the base 20 remains in starting position). In a fourth position 104, the platform 40c has been elevated to a high position (at or close to full extension, in some embodiments), as has the support 30c.

During this process, the support tab has moved closer to the bottom end of the platform, and the angle of the support tab 32 with respect to the platform 40 has moved from oblique 32 (position 101) to close to orthogonal 32b, to acute 32c (position 104), due to rotation of the corresponding upper joint.

In several embodiments, one or more protective strips 50a, b extend laterally across the support arms. These protective strips are silicone, rubber, or the like, and protect the components from scratching or damaging each other in the collapsed state. These also may help provide a grip for user when moving the support section or the stand. In the figures, the strips 50a proximate the upper end of the support arms are located on the user-side face of the support, while the strips 50b proximate the lower end of the support arms are located on the opposite face of the support.

In various embodiments, the stand is made of metal, metal alloy, or similar material. The stand may extend to a height of approximately 11 inches (measured to the top edge of the platform), and may collapse to a height of less than approximately 1 inch for transportability. At full extension, the stand will support a laptop or computing device that is substantially larger in length and width than the platform, thereby allowing the laptop display, and any camera thereon, when the laptop is open to extend to a substantially greater height above the tabletop or desktop. In several embodiments, the stand can support a laptop or computing device up to around 8 lbs in weight.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An adjustable stand for a computing device, comprising:
   a base;
   a platform; and
   a pair of support arms, each arm with an upper end and a lower end;
   wherein the base is hingedly attached to the lower end of each support arm at a respective lower hinge joint, and the platform is hingedly attached to or proximate to the upper end of each support arm at a respective upper hinge joint;
   wherein the stand is movable from a closed position to a fully extended position by movement of the respective lower and upper hinge joints;
   wherein the upper end of each support arm beyond the upper hinge joint is bent upward to form a stop tab above the upper hinge joint in said fully extended position; and
   wherein the stop tab is above the remainder of the corresponding support arm in said fully extended position.

2. The stand of claim 1, wherein the upper hinge joints are configured to move without movement of the lower hinge joints when moving from the collapsed position to a first position short of the fully extended position.

3. The stand of claim 1, wherein the base comprises a partially curved or U-shape with two ends, with the two ends at the back of the base.

4. The stand of claim 3, wherein the lower hinge joints are located at the corresponding two ends at the back of the base.

5. The stand of claim 1, wherein the platform comprises a partially curved or U-shape with two ends, with the two ends at the front of the platform.

6. The stand of claim 5, wherein the upper hinge joints are located at or proximate to the corresponding two ends at the front of the platform.

7. The stand of claim 1, wherein
   the base comprises a partially curved or U-shape with two ends, with the two ends at the back of the base;
   the platform comprises a partially curved or U-shape with two ends, with the two ends at the front of the platform; and
   each support arm extends from a corresponding end at the back of the base to a corresponding end at the front of the platform.

8. The stand of claim 1, wherein an upper face of the platform is covered in whole or in part with a nonslip material.

9. The stand of claim 1, wherein an upper face of each stop tab is covered in whole or in part with a nonslip material.

10. The stand of claim 9, wherein the angle between the upper face of each stop tab and an upper face of the platform changes as the stand is moved from a closed position to an open position.

11. The stand of claim 10, wherein in the closed position, the topmost part of the stop tabs do not extend higher than the upper face of the platform.

12. The stand of claim 9, wherein the angle between the upper face of each stop tab and an upper face of the platform is obtuse in the closed position, and is acute in a fully open position.

13. The stand of claim 1, wherein each support arm further comprises a first protective strip extending laterally across at least a portion of the lower surface of the support arm, and a second protective strip extending laterally across at least a portion of the upper surface of the support arm.

* * * * *